(12) United States Patent
Stevens et al.

(10) Patent No.: US 11,343,344 B1
(45) Date of Patent: May 24, 2022

(54) PROXY SERVER ENTITY TRANSFER MODES

(71) Applicant: Akamai Technologies, Inc., Cambridge, MA (US)

(72) Inventors: Matthew J. Stevens, Lexington, MA (US); Michael G. Merideth, Carrboro, NC (US); Nil Alexandrov, Cambridge, MA (US); Andrew F. Champagne, Ware, MA (US); Brendan Coyle, Sudbury, MA (US); Timothy Glynn, Malden, MA (US); Mark A. Roman, Arlington, MA (US); Philip A. Lisiecki, Santa Barbara, CA (US); Xin Xu, Waltham, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 17/325,450

(22) Filed: May 20, 2021

Related U.S. Application Data

(60) Provisional application No. 63/201,337, filed on Apr. 23, 2021.

(51) Int. Cl.
*G06F 15/167* (2006.01)
*H04L 67/563* (2022.01)
*H04L 67/60* (2022.01)
*H04L 67/02* (2022.01)

(52) U.S. Cl.
CPC .......... *H04L 67/2814* (2013.01); *H04L 67/02* (2013.01); *H04L 67/32* (2013.01)

(58) Field of Classification Search
CPC ...... H04L 67/2814; H04L 67/02; H04L 67/32
USPC ................................. 709/212, 223, 226, 232
See application file for complete search history.

(56) References Cited

U.S. PATENT DOCUMENTS

| | | | |
|---|---|---|---|
| 6,108,703 | A | 8/2000 | Leighton et al. |
| 7,058,706 | B1 | 6/2006 | Iyer et al. |
| 7,096,263 | B2 | 8/2006 | Leighton et al. |
| 7,096,266 | B2 | 8/2006 | Lewin et al. |
| 7,240,100 | B1 | 7/2007 | Wein et al. |
| 7,251,688 | B2 | 7/2007 | Leighton et al. |
| 7,274,658 | B2 | 9/2007 | Bornstein et al. |
| 7,293,093 | B2 | 11/2007 | Leighton et al. |

(Continued)

*Primary Examiner* — Liang Che A Wang

(57) ABSTRACT

A proxy server is augmented with the capability of taking transient possession of a received entity for purposes of serving consuming devices. This capability supplements destination forwarding and/or origin server transactions performed by the proxy server. This capability enables several entity transfer modes, including a rendezvous service, in which the proxy server can (if invoked by a client) fulfill a client's request with an entity that the proxy server receives from a producing device contemporaneous with (or shortly after) the request for that entity. It also enables server-to-server transfers with synchronous or asynchronous destination forwarding behavior. It also enables a mode in which clients can request different representations of entities, e.g., from either the near-channel (e.g., the version stored at the proxy server) or a far-channel (e.g., at origin server). The teachings hereof are compatible with, although not limited to, conventional HTTP messaging protocols, including GET, POST and PUT methods.

12 Claims, 8 Drawing Sheets

(56) References Cited

U.S. PATENT DOCUMENTS

| | | | |
|---|---|---|---|
| 7,484,002 B2 | 1/2009 | Swildens et al. | |
| 7,523,181 B2 | 4/2009 | Swildens et al. | |
| 7,574,499 B1 | 8/2009 | Swildens et al. | |
| 7,603,439 B2 | 10/2009 | Dilley et al. | |
| 7,640,347 B1* | 12/2009 | Sloat | H04L 67/2842 |
| | | | 709/203 |
| 7,716,367 B1 | 5/2010 | Leighton et al. | |
| 7,725,602 B2 | 5/2010 | Liu et al. | |
| 7,912,978 B2 | 3/2011 | Swildens et al. | |
| 7,925,713 B1 | 4/2011 | Day et al. | |
| 7,941,525 B1* | 5/2011 | Yavilevich | H04L 67/02 |
| | | | 709/224 |
| 7,996,531 B2 | 8/2011 | Freedman | |
| 8,195,831 B2 | 6/2012 | Swildens et al. | |
| 8,423,662 B1 | 4/2013 | Weihl et al. | |
| 9,648,125 B2 | 5/2017 | Flack et al. | |
| 9,807,190 B2 | 10/2017 | Flack et al. | |
| 9,813,515 B2 | 11/2017 | Flack et al. | |
| 9,942,363 B2 | 4/2018 | Stevens et al. | |
| 10,063,652 B2 | 8/2018 | Flack et al. | |
| 10,404,820 B2 | 9/2019 | Flack et al. | |
| 10,547,703 B2 | 1/2020 | Flack et al. | |
| 10,630,771 B1 | 4/2020 | Garza et al. | |
| 10,667,172 B2 | 5/2020 | Ingerman | |
| 2003/0144894 A1* | 7/2003 | Robertson | G06Q 20/00 |
| | | | 709/226 |
| 2008/0003964 A1* | 1/2008 | Alperin | H04M 3/5233 |
| | | | 455/185.1 |
| 2009/0307232 A1* | 12/2009 | Hall | G06F 16/9554 |
| 2015/0207897 A1* | 7/2015 | Flack | G06F 16/00 |
| | | | 709/213 |
| 2015/0294377 A1* | 10/2015 | Chow | G06Q 30/0282 |
| | | | 705/347 |
| 2016/0065635 A1* | 3/2016 | Besehanic | H04N 21/4667 |
| | | | 709/224 |

* cited by examiner

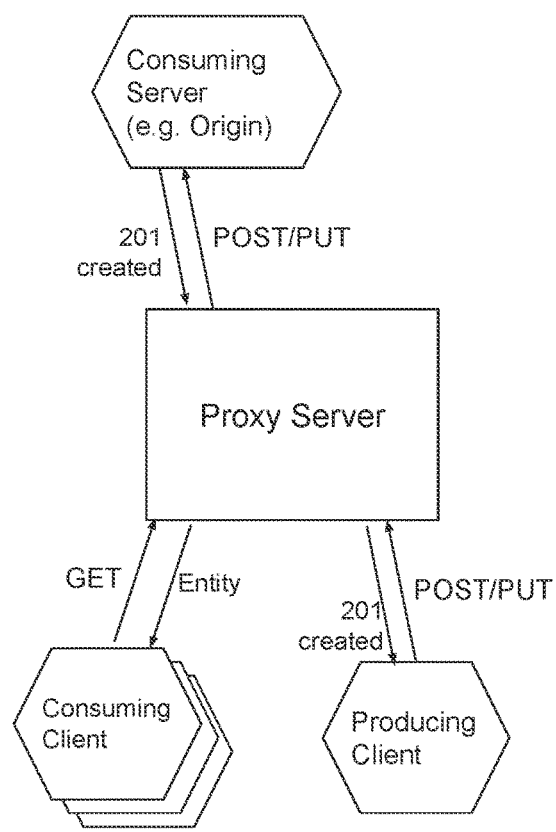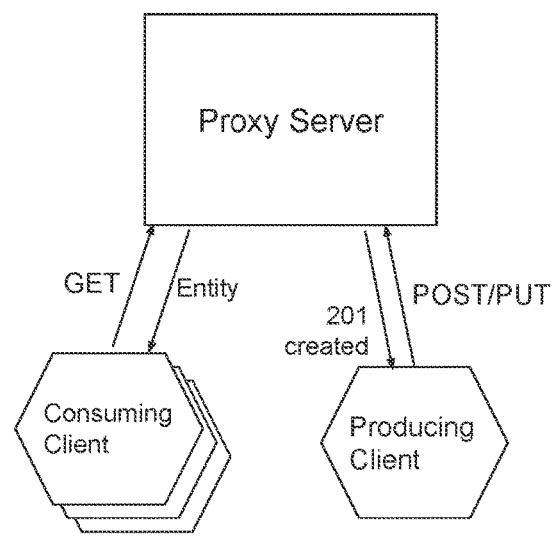
*FIG. 1A*   *FIG. 1B*

PROXY SERVER ENTITY TRANSFER MODES

BACKGROUND

Technical Field

Among other things, this application generally relates to the design and operation of distributed computing systems, proxy server networks, and proxy servers themselves.

Brief Description of the Related Art

Delivery of content over the Internet has been significantly improved by the deployment of content delivery networks (CDNs). CDNs are essentially distributed computing systems, typically composed of large sets of proxy servers that form an overlay network and provide HTTP and related services. The proxy servers typically provide a caching function from a local data store. That is, a proxy server stores content that was fetched from an origin server for the content. The content might be fetched directly by the proxy server or indirectly through a parent server or other topological architectures. There are many well-known techniques to manage the coherency of the cached content against the origin (and other proxy servers) and to control refresh operations, all the while attempting to optimize performance. Examples include setting time to live (TTL) values for content using if-modified-since or IMS commands, Etag validation, prefetching, limited serve-stale features, and the like.

Conventional CDN architectures can be thought of as facilitating the transfer of content in a vertical manner. At the lowest level (dowstream), end user clients request content from a proxy server (preferably located at a network edge). The proxy server can issue a request "upstream" to a parent server which may in turn query an origin server at the top of the hierarchy. The proxy server can also query the origin directly, and/or query peer servers before going "forward", that is, "upstream". The requested content is returned down to the proxy and ultimately served to the end user client. These operations are often carried out at the application layer using HTTP protocol.

However, there is an increasing need to transfer content in ways that conventional approaches do not support well, or at all. Consumable content is generated not only up at origin but throughout a network. Client devices, for example, may be producing message flows, publishing messages on a given topic, issuing status reports, reaching out to other client devices, or updating a distributed database (such as no-SQL, eventually consistent databases). Other nearby clients may be interested in such information before it travels upstream, and ideally they should receive it sooner since they are in fact closer to the source of the content geographically and/or in network distance terms.

This patent application presents, among other things, systems and methods in which proxy servers facilitate the transfer of content in new ways. The teachings hereof enable new modes of operation for a proxy server. These new modes are referred to as entity transfer modes. While the teaching hereof are not necessarily limited to HTTP, the term entity is a term used in relation to HTTP to describe the body of the content (sometimes referred to as an object) for which the proxy intermediates transfer from a producing device to a consuming device, and to describe any associated headers or meta-information about that content (such as a TTL).

A device that produces an entity for consumption by other devices is a producing device; it may be a client or a server. Consuming devices likewise may be clients or servers.

Accordingly, the teachings hereof provide new capabilities and represent a technical improvement to proxy servers, and to distributed computing systems (e.g., CDNs).

More information about CDN technologies, including examples of proxy server design, can be found in the following documents, the teachings of which are hereby incorporated by reference in their entireties: U.S. Pat. Nos. 6,108,703; 7,293,093; 7,096,263; 7,096,266; 7,484,002; 7,523,181; 7,574,499; 7,240,100; 7,603,439; 7,725,602; 7,716,367; 7,996,531; 7,925,713; 7,058,706; 7,251,688; 7,274,658; 7,912,978; 8,195,831.

BRIEF SUMMARY

This section describes some pertinent aspects of the invention. Those aspects are illustrative, not exhaustive, and they are not a definition of the invention. The claims of any issued patent define the scope of protection. The claims are incorporated by reference into this section, in their entirety.

A proxy server is augmented with the capability of taking transient possession of a received entity for purposes of serving consuming devices, without or in addition to destination forwarding and/or origin server transactions. This ability enables several entity transfer modes, including a rendezvous service, in which the proxy server can (if invoked by a client) fulfill a client's request with an entity the proxy server receives from a producing device contemporaneous with (or shortly after) the client's request for that entity arrives. It also enables a server-to-server transfer mode with synchronous or asynchronous destination forwarding behavior. It also enables a mode in which clients can request different representations of entities from the proxy server, e.g., from either a 'near-channel' (e.g., the version stored in cache at the proxy server) or a 'far-channel' (e.g., from the origin server). The teachings hereof are compatible with, though not limited to, conventional HTTP messaging protocols, including GET, POST and PUT methods.

BRIEF DESCRIPTION OF THE DRAWINGS

The invention will be more fully understood from the following detailed description taken in conjunction with the accompanying drawings, in which:

FIG. 1A is a diagram illustrating an example of a proxy server transfer mode that involves transferring an entity from a producing client to consuming clients and a consuming server;

FIG. 1B is a diagram illustrating an example of a proxy server transfer mode that involves transferring an entity from a producing client to consuming clients;

Figure 2:
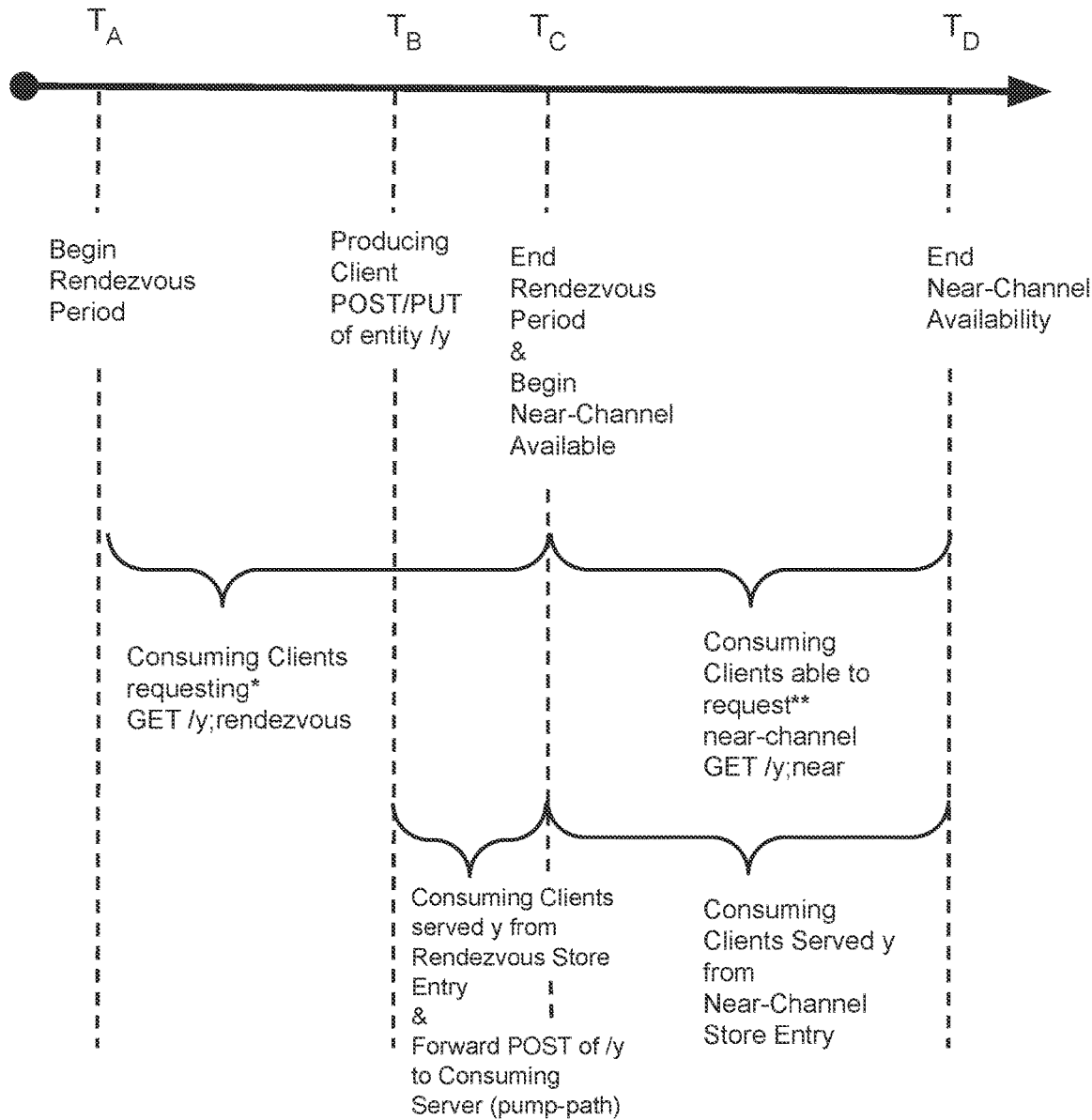
FIG. 2 is a timing diagram showing an order of events at the proxy server in the system depicted in FIGS. 1A and 1B.

Numerical labels are provided in some FIGURES solely to assist in identifying elements being described in the text; no significance should be attributed to the numbering unless explicitly stated otherwise.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different hosts in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, HTTP including versions 1.1 and 2, HTTP over QUIC, MQTT, TCP/IP, and UDP, is assumed.

All references to HTTP should be interpreted to include an embodiment using encryption (HTTP/S), such as when transport layer security (TLS) is employed to secure connections. While context may indicate the hardware or the software exclusively, should such distinction be appropriate, the teachings hereof can be implemented in any combination of hardware and software. Hardware may be actual or virtualized.

Throughout the following description, HTTP protocol will be used to illustrate various processes. While the teachings hereof are especially useful in the context of HTTP, it should be understood that these are non-limiting embodiments and the teachings hereof may be applied to other protocols.

The term "entity" is used herein to refer to the concept of an "entity" as used in HTTP standards (e.g., IETF RFC 2616), and equivalents. The teachings hereof are highly applicable to HTTP messaging; however the term "entity" is not meant to indicate that compliance with HTTP standards (e.g., in message structure, formatting, or otherwise) is necessary to practice the invention.

An entity typically has entity header fields and an entity body. Entity header fields often contain meta-information about the body, or the sender, or other subject. A given request and response message may contain, in some cases, only entity-headers. The entity body is sometimes referred to as an "object" or an item of "content". In the web context, an exemplary entity body is data forming an image, script, HTML document, JSON document, or the like, but there is no limitation as to what the entity represents. The entity could also carry messages being published (by the producing device) on a particular topic or channel to one or many subscribers (consuming devices).

As those skilled in the art will understand, HTTP/2 protocols (e.g., IETF RFC 7540) can be used when implementing the systems and methods being described in this patent document; indeed the teachings hereof are not limited to any given protocol or standard. In HTTP/2, for example, entity headers can be carried in HEADER frame(s), and the entity body can be carried in DATA frame(s).

The following description uses an example of an entity 'y' is associated with a URL http://domain<dot>com/path-foo/y This is sometimes referred to as the /y entity for short.

Described herein is a service sometimes referred to as a "rendezvous" service. The rendezvous service is provided by the proxy server, or by the proxy server network. An actor (e.g., a consuming device) can request rendezvous service with respect to a given request that is for a given entity (or that is otherwise associated with a given entity). Put another way, typically (but without limitation) the rendezvous service is scoped to a given request which is associated with a given entity. A consuming device can issue an HTTP GET request for an entity and, for example, indicate that it desires rendezvous service for such request by using a URL parameter or request header (or using other alternatives, which will be described below). For convenience of description, such a request is referred to herein as a "rendezvous" request. Likewise the use of the rendezvous service is referred to herein, for convenience, as the consuming device being able to "rendezvous" with an entity, or to "rendezvous" with the producing device.

Note that a producing device, in certain instances, might also request the proxy server provide a rendezvous service with respect to a given entity that the producing device is sending to the proxy server. A producing device might coordinate the rendezvous with consuming devices via an out-of-band channel. Alternatively, the producing device could signal that a given entity transfer (e.g., an HTTP POST/PUT request it sends) is eligible for or should use the rendezvous service, e.g., using an HTTP request header, URL parameter, or other signal.

Entity Transfer Mode: Producing Device is a Client

FIG. 1A illustrates at a high level the case where a producing client sends an HTTP entity to the proxy server using an HTTP POST or PUT method. The proxy server responds, e.g., with a conventional HTTP 201 'Created' message. Upon receiving the HTTP POST or PUT with the entity, the proxy server looks up a policy applicable to the received entity (or to a domain associated therewith). This policy may be defined by a content provider and/or CDN operator, e.g., as described in U.S. Pat. Nos. 7,240,100 and/or 9,942,363, the teachings of which are hereby incorporated by reference, or in any other way.

The policy directs the proxy server to handle the entity in a special way. The proxy server begins to upload the entity to the intended destination, e.g., the origin server. It can do that by creating a temporary copy of the entity in a transfer buffer in memory, opening a transport layer connection to the origin server if not already available, using an HTTP message and thereby beginning to transfer the bytes of the entity to the origin server. (In this regard, it is helpful to remember that the producing client typically will have been directed to the proxy server in the first place as a result of a domain name lookup, and the origin server is associated with that domain name.) It should be noted that the origin server could be another consuming server. Examples include a parent in the proxy server's overlay network, such as a cache parent server or a gateway server. Such servers may themselves relay the entity to the origin. The consuming server could even be a peer, e.g., another server co-located with the proxy server.

Concurrent with the upload to the origin or other consuming server, the proxy server stores the entity in its cache, that is, into a store entry in a local data store. Consuming clients are able to request and be served with the entity from that store entry by making a request to a URL associated with the store entry. Such a request can be made shortly before or at the time that the entity arrives at the proxy server. In this way the entity is transferred directly from the producing client to the requesting consuming clients in FIG. 1A.

As noted earlier, the ability of consuming clients to request and receive the entity as it arrives from the producing client (and as it is sent to the consuming server) is referred to as the "rendezvous" service provided by the proxy server. Consuming clients are able to ask for rendezvous with the received entity by requesting the entity from the URL during a limited time period before the producing client sends it to the proxy server, and/or contemporaneously with the producing client sending it to the proxy server.

FIG. 1B is similar to FIG. 1A; however, FIG. 1B omits the POST or PUT request that would send the entity up to the consuming server. (That omitted POST or PUT request is often referred to as a 'forward request' in a CDN.) In other words, FIG. 1B shows the producing client sending an entity to the proxy server and the proxy server delivering that entity directly to the consuming clients, without going forward. This is an alternative example of how the system can operate.

FIG. 2 is a timing diagram related to FIGS. 1A and 1B. It shows events that occur from the perspective of the proxy server. Note that the diagrams are meant to show the general timeline of events so they should not be taken as exact representations of timing at the level of specific events occurring in executing computer processes.

FIG. 2 illustrates when a consuming client may rendezvous with the uploaded entity from the producing client. Assume consuming clients are generally issuing HTTP GET requests for an example entity 'y' to the proxy server at a URL of http://domain<dot>com/path-foo/y. Consuming clients may indicate that they wish to have the proxy server attempt to rendezvous their entity request with a subsequent or contemporaneously uploaded entity from a producing client by using a predetermined transform of the entity URL (in this case, /y becomes /y;rendezvous). Time $T_B$ represents the time at which a producing client sends a POST/PUT request to the proxy server. The proxy server will hold consuming clients' GET requests that want to rendezvous for some configurable or event-driven time period, $T_B$ minus $T_A$, in an effort to fulfill them with the entity arriving at time $T_B$. Consuming client requests arriving contemporaneously with $T_B$ are also able to rendezvous. In both cases, the consuming clients are served from a copy of the entity in a store entry referred to herein as a rendezvous store entry.

At $T_C$ in FIG. 2, the proxy server ceases to offer rendezvous service for the entity that arrived at $T_B$. This means that a consuming client's request for /y;rendezvous will be either rejected, or be held for the next upload of the entity from a producing client. If a consuming client's rendezvous request "misses" the uploaded entity, preferably it does not trigger a forward request by the proxy server to the origin to fetch the entity, although of course different implementations could handle this situation differently. Typically, $T_C$ is when the proxy server finishes writing the entity into the rendezvous store entry in cache (i.e., when that store entry is finalized). The time $T_C$ may occur at approximately the same time as the proxy server finishes forwarding the entity to the consuming server (if forwarding is performed). The period $T_B$ to $T_C$ could be configured explicitly, or event-driven. For example, the period $T_B$ to $T_C$ can be configured to end automatically once, or shortly after, the proxy server finishes pumping the bytes of the entity upstream to the origin.

Between times $T_C$ and $T_D$, consuming clients are able to request the version of the entity stored locally in the cache of the proxy server by issuing an HTTP GET to /y;near. As noted, this is referred to as the near-channel, and the consuming client is served from the near-channel store entry. The proxy server handles such near-channel requests by suppressing a forward request operation that would otherwise go to a parent or origin, and instead serving directly from cache. Alternatively, consuming clients can ask the proxy server for the 'authoritative' version of the entity, which needs to come from or be validated with the copy at origin. So the proxy server would check if its cached version of the entity is current, e.g., via an if-modified-since (IMS) in a forward request, and if not, the current version of the entity would be transferred from the origin to the proxy server and served to the consuming client.

At $T_D$, the proxy server may no longer offer the near-channel service, at least in some implementations. $T_D$ may be triggered by an event or determined by a configured time period following $T_C$ or $T_B$.

After $T_D$, the proxy server either might be implemented to reject a near-channel request, for example, or override it and validate the cached entity against the origin copy, fetching it if needed, before serving the entity.

It should be noted that the rendezvous store entry and the near-channel store entry can be implemented as the same store entry. Also, in some situations, the proxy server might convert a consuming client's rendezvous request for the entity to a near-channel request, based on some native logic, policy, or upon signalling from the consuming client that this is desired rather than a 'too-late' rendezvous request being held for the next possible rendezvous.

Figure 3:
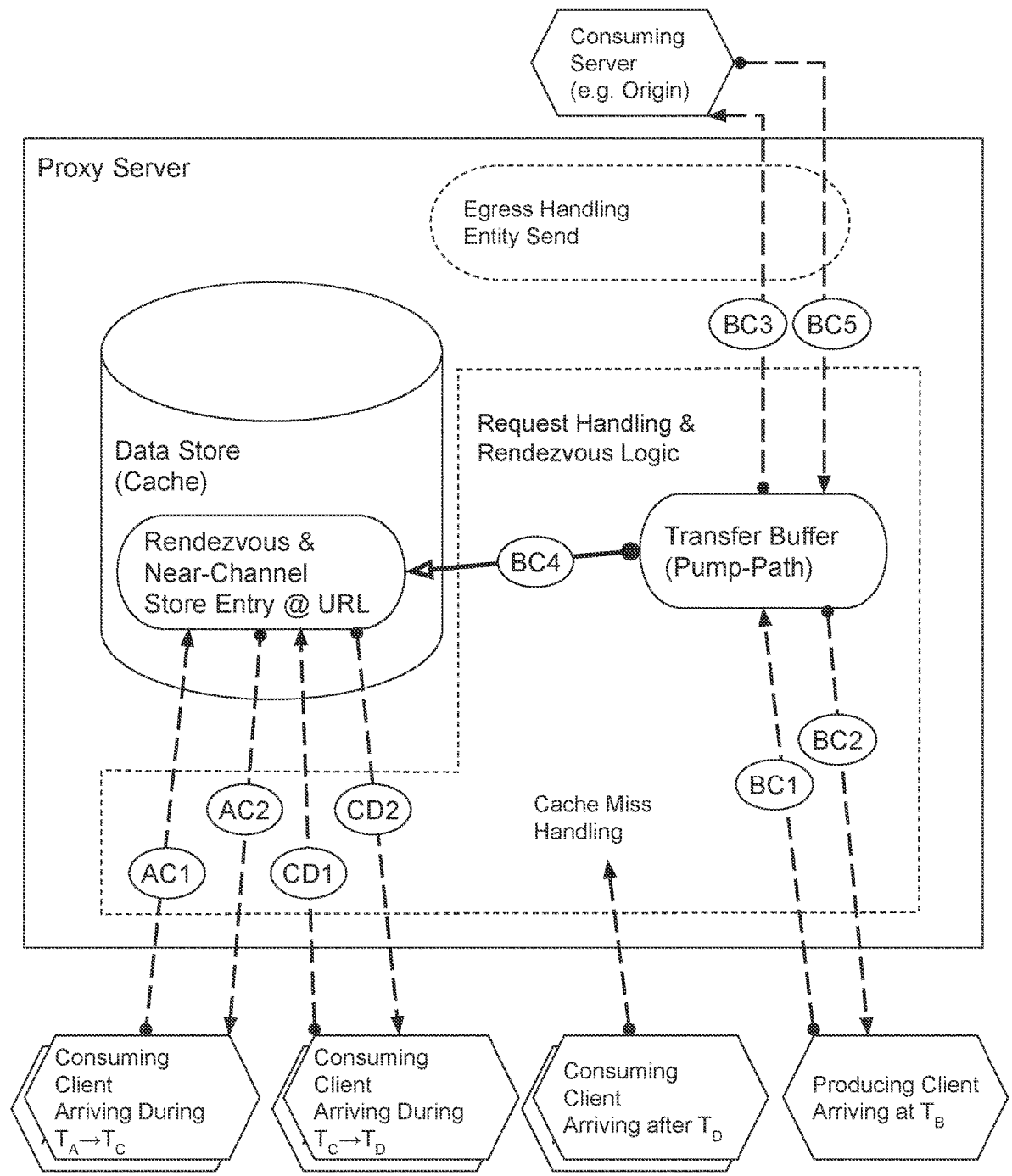
FIG. 3 is a block diagram illustrating an example of message flow and operation at the proxy server from FIGS. 1A, 1B in greater detail.

FIG. 3 illustrates the operation of the proxy server in greater detail. The arrows represent the messages. The circular labels on the arrows have letters that correspond to the time at which (or time periods during which) the messages are sent, with respect to the timeline shown in FIG. 2. For example, labels BC1 to BC4 occur substantially during the time period $T_B$ to $T_C$, as shown in FIG. 2. (BC1 would occur at time $T_B$, when the producing client sends the entity, thus beginning the $T_B$ to $T_C$ time period.) Messages AC1 and AC2 occur during the time period $T_A$ to $T_C$. Labels CD1 and CD2 occur substantially during the time period $T_C$ to $T_D$.

The table below describes each labeled message:

| Label | Message (Example) | Description and Notes |
|---|---|---|
| AC1 | HTTP GET /path-foo/y:rendezvous | Client device requesting rendezvous service. (Note that in some implementations, conventional GET request to /y during rendezvous period could be implicitly treated as a rendezvous request if from certain clients, for certain entities, etc.) |
| AC2 | HTTP 200 ok containing entity /path-foo/y;rendezvous | Response to AC1 once entity is available in rendezvous store entry |
| BC1 | HTTP POST\|PUT /path-foo/y | The message might carry the entity y itself, or contain data from which the proxy server can compose the entity y |
| BC2 | HTTP 201 created | Conventional reply & acknowledgement of POST\|PUT |
| BC3 | HTTP POST\|PUT /path-foo/y | Forward request to send entity upstream |
| BC4 | Internal call to a routine that writes entity from POST or PUT into a store entry | Internal operation to copy data from transfer buffer to store entry and notify request handling logic that is holding rendezvous requests |
| BC5 | HTTP 201 created | Conventional reply & acknowledgement of POST\|PUT |
| CD1 | HTTP GET /path-foo/y;near | Client device requesting near-channel. (Note that in some implementations, conventional GET request to /y during near-channel period could be implicitly treated as a near-channel request if from certain clients, for certain entities, etc.) |
| CD2 | HTTP 200 ok containing entity /path-foo/y;near | Response to CD1 from near-channel store entry |

The message exchanges in FIG. 3 and the underlying proxy server operations are now described.

Assume that a producing client arrives at $T_B$ by sending to the proxy server a POST/PUT request for the entity y, which is arrow BC1 In response, the proxy server places the entity in a transfer buffer, and the proxy server opens or reuses an open connection to the appropriate consuming server (e.g., the origin for the domain in the POST/PUT request).

The proxy server begins to send the entity upstream at BC3. The path from BC1 to BC3 is referred to as the pump-path because the proxy server is pumping the bytes that make up the entity to the consuming server. Of course, the proxy server also responds to the producing client with an appropriate acknowledgment, e.g., transport layer acknowledgements as bytes are received, and at the end of the transfer (BC5), an application layer message: HTTP 201 created.

Concurrently, the proxy server request handling logic looks up the policy for entity /y and determines that the entity is eligible for rendezvous service. Hence, the proxy server writes the entity to a store entry in the data store, and in particular, to the rendezvous store entry. That operation is shown at BC4. Store entries in the data store are addressable with a store key, often referred to in the art as a cache key. The proxy server generates the store key to use for the entity by calculating it. The calculation can be based on a variety of parameters associated with the POST/PUT request from BC1, e.g., including the URL (or a hash thereof), the HTTP method, other HTTP headers, and so on. (Typically the cache key calculation involves a MD5 hash function applied over such information, but the particular cache key calculation is not crucial to the teachings hereof as long as it provides the functionality described herein.)

The proxy server continues to copy the entity into the rendezvous store entry of the local data store as it arrives (e.g., on a byte-by-byte as it is being pumped upstream).

Now, consider the consuming clients arriving between $T_A$ and $T_C$, which are issuing HTTP GET requests for the entity /y with rendezvous service (AC1). The proxy server's request handling logic determines first that the request is for rendezvous services. The consuming client may signal this desire using a parameter in the URL (/y;rendezvous), a value in an HTTP header field, or in any other suitable way.

To find the proper store entry, the proxy server can calculate the store key as was done for the POST/PUT of the entity by the producing client. However, it switches the HTTP method from the GET in the consuming client's rendezvous request to a POST or PUT, as appropriate. It may also need to adjust the URL, e.g., by changing /y;rendezvous to /y. In this way, the proxy server calculates the store key and looks to see if the store entry for the producing POST or PUT is actually available with the entity /y. If the consuming client arrived before $T_B$, then it will not be, and the proxy server holds or queues the consuming client's request. The proxy server can periodically ping the rendezvous store entry to see if the entity has arrived, or set a call back so that when it arrives the pending requests can be satisfied.

If the consuming client arrives around the same time as $T_B$, or for a short period afterwards (between $T_B$ and $T_C$), then the rendezvous store entry with entity /y may be found and the proxy server can serve the entity in response to the request. Thus, the proxy server may in fact be transmitting the bytes of the entity to the consuming clients at the same as the proxy server is transmitting bytes of the entity to the consuming server (although this is not a requirement). The proxy server calls back to the request handling procedure that has queued the previously-received rendezvous requests, and responds to them by serving the entity from the rendezvous store entry. Also, any consuming client requests arriving to the URL at this time ($T_B$) can be fulfilled from the rendezvous store enty.

Finally, consider requests for near-channel service of /y (consuming clients arriving $T_C$ to $T_D$, and CD1 in FIG. 3). The proxy server's request handling logic determines first that the request is for near-channel service. The consuming client may signal this desire using a parameter in the URL (/y;near), a value in an HTTP header field, or in any other suitable way.

The proxy server can calculate the proper store entry for near-channel service in the same way as it did for the rendezvous service. In some implementations, however, the near-channel service could be provided by the conventional store entry for entity /y, for which the store key is calculated from the GET request; in this case, the lookup is the same as it would be for conventional GET requests, except that the proxy server does not go forward to the origin to fetch the entity if it is not present, expired, or otherwise not valid to serve.

Summarizing, the proxy server may maintain for a given entity /y three distinct store entries in the cache: (1) a rendezvous store entry that can correspond to the uploaded entity from a POST or PUT; (2) a near-channel store entry, which may be the same as the rendezvous store entry, or may be the same as the store entry for the entity retrieved from the origin in a conventional proxy server forward GET request operation, or may be a dedicated near-channel store entry and (3) the conventional store entry for /y retrieved from the origin in a conventional proxy server forward GET request operation.

After time $T_D$, the near-channel is no longer available. Assuming the proxy server is implemented not to reject such "late" requests, a consuming client's GET request to the URL for entity /y can be handled using conventional logic for "cache miss handling", that is, the proxy server validates the freshness of the entity stored in the store entry against an upstream parent cache or the origin, e.g., using an if-modified since request. A fresh copy can be served to the consuming client and cached for the associated time to live period. A stale copy is overwritten with a fresh copy fetched from origin.

While the rendezvous operation has been described above as store entry lookup for a GET request being transformed into one for the corresponding POST or PUT, the reverse is also possible, at least in some implementations. For example, the logic handling the pump-path can write the entity into a store entry by transforming the URL and other parameters of the POST into a GET and other parameters of the rendezvous request. This puts the conversion burden on the logic writing into the store entry, rather than on the logic reading out of the store entry in response to the rendezvous requests.

Entity Transfer Mode: Producing Device is a Server

Figure 4A:
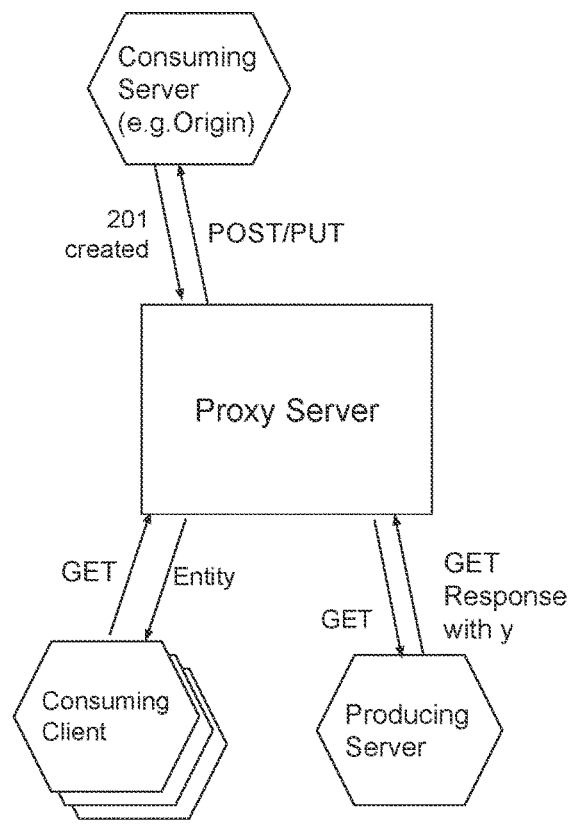
FIG. 4A is a diagram illustrating an example of a proxy server transfer mode that involves transferring an entity from a producing server to consuming clients and a consuming server.

FIG. 4A is similar to FIG. 1A except that the device that produces the entity is a server rather than a client. The proxy server first requests the entity from the producing server, e.g., using a HTTP GET. That request may be a long poll, for example. Alternatively, the proxy server's GET request may be synchronous to some other event or edge logic operating at the proxy server, and/or triggered by a request or other message received at the proxy server. In FIG. 4A, the producing server responds to the proxy server's GET request by serving the entity to the proxy server.

Figure 4B:
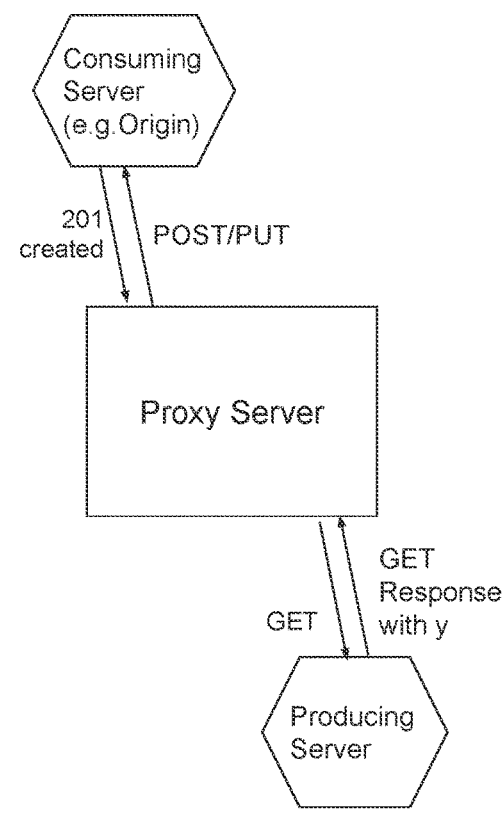
FIG. 4B is a diagram illustrating an example of a proxy server transfer mode that involves transferring an entity from a producing server to a consuming server.

FIG. 4B shows that in some embodiments, the proxy server does not provide rendezvous service for consuming clients. In such embodiments, the proxy server pumps the entity to a consuming server via a forward HTTP POST or PUT request. The proxy server may make that POST/PUT request synchronously or asynchronously to the GET response that the proxy server received from the producing server.

Figures 4C, 4D:
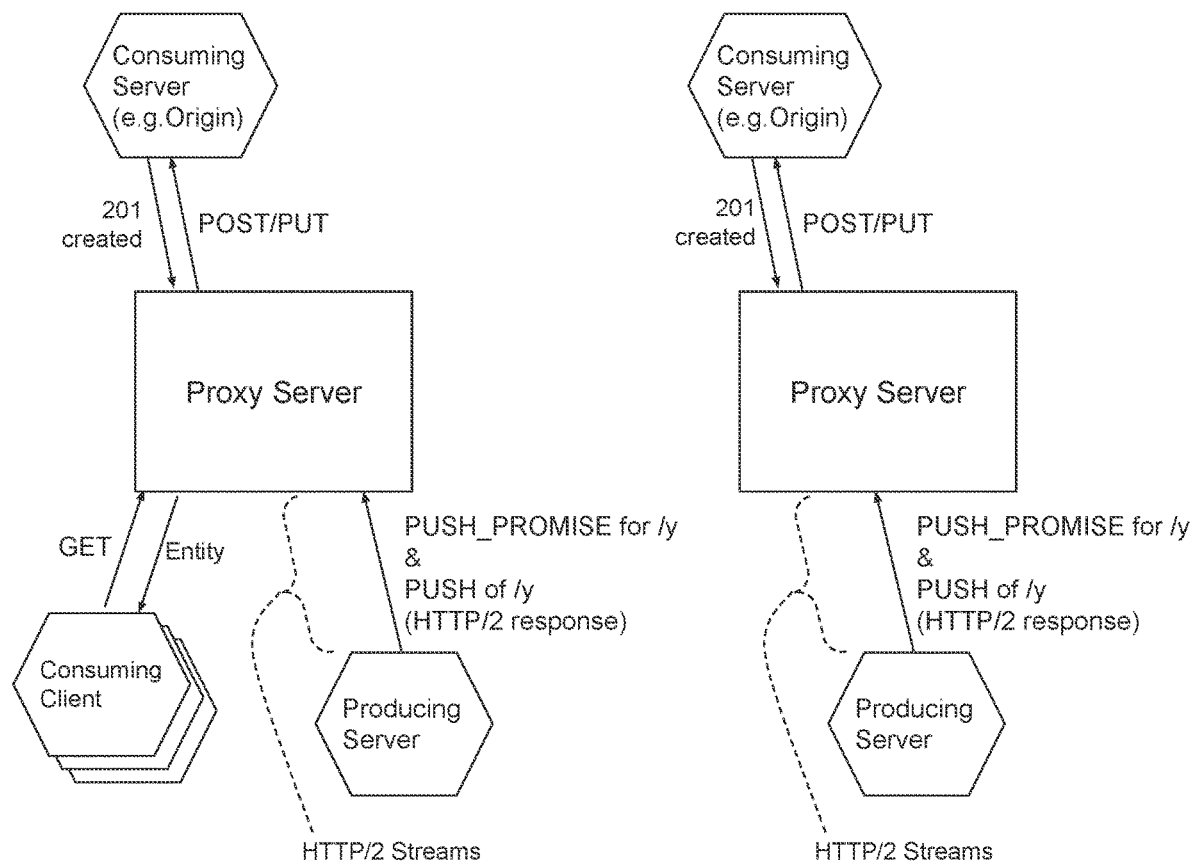
FIG. 4C is a diagram similar to FIG. 4A but illustrating the use of HTTP/2 message exchanges.
FIG. 4D is a diagram similar to FIG. 4B but illustrating the use of HTTP/2 message exchanges.

FIGS. 4C and 4D are similar to FIGS. 4A and 4B, respectively. However FIGS. 4C and 4D illustrate the use of HTTP/2 message exchanges, and server push in particular between the proxy server and producing server. Hence, in the implementation shown in FIG. 4C, the producing server initiates the entity transfer process rather than the proxy server (acting as a client) doing so for the entity. More specifically, given an existing, open HTTP/2 stream between the proxy server and producing server, the producing server can issue a PUSH_PROMISE frame on that open stream for the entity /y. Unless the proxy server refuses the push (e.g., with a CANCEL or REFUSED_STREAM code in a RST_STREAM frame), the producing server can push the entity /y on a new server-initiated stream, using an HTTP/2 response per RFC 7540, and finishing with an END_STREAM frame.

The description that follows focuses largely on the FIGS. 4A-B implementation when describing message exchanges, but those skilled in the art should understand that HTTP/2 (including in particular server push) can be used instead.

Figure 5:
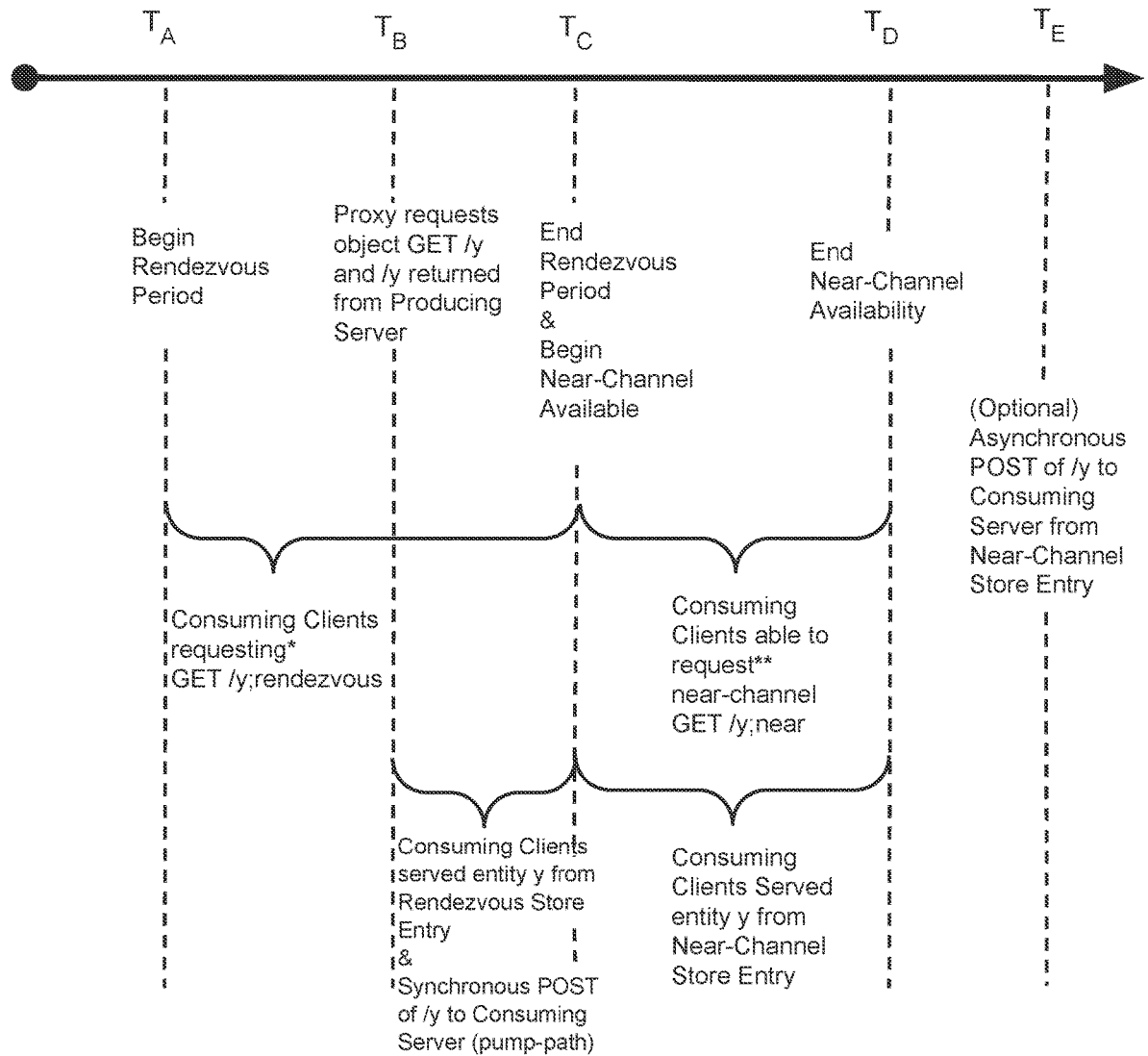
FIG. 5 is a timing diagram showing an order of events at the proxy server as in the system depicted in FIGS. 4A and 4B.

FIG. 5 is a timing diagram related to FIGS. 4A and 4B. FIG. 5 shows events occurring from the perspective of the proxy server. The timeline illustrates when a consuming client may rendezvous with an entity from a producing server, as well as how the proxy server may issue an asynchronous POST/PUT to send that entity upstream to a consuming server.

FIG. 5 is similar to FIG. 2 in many respects; however, at time $T_B$, instead of a producing client sending the entity /y, the proxy server requests the entity from the producing server and the producing server responds with the entity /y. (Of course the request and reply message exchange would not occur exactly simultaneously but for purposes of the diagram they are illustrated both at $T_B$).

As in FIG. 2, consuming clients may request the entity during a defined rendezvous time period beforehand, which is $T_B$ minus $T_A$. The time period $T_B$ to $T_C$ a brief time after $T_B$ during which the entity is available and served to consuming clients that happen to arrive while the entity is received from the consuming server and being handled at the proxy server, e.g., contemporaneously with the entity being pumped upstream. After $T_C$, the near-channel service is available to consuming clients at the designated near-channel URL. During some time period later, $T_C$ to $T_D$, the near-channel service is no longer offered, finally stopping at $T_D$. As with FIG. 2, time periods could be configured or event driven.

As mentioned above, in some embodiments, the proxy server synchronously transmits the entity upstream to a consuming server upon receipt from the producing server, using e.g., a forward HTTP POST/PUT request. In other embodiments, the proxy server can hold the entity for some period of time, and then asynchronously transfer the entity to the consuming server. The holding period can be configurable or triggered by an event, such as the transfer channel to the consuming server becoming available/established/uncongested, which can ease any potential mismatch between the communication transfer characteristics of the client side and server side channels of the proxy server. In FIG. 5 the asynchronous operation occurs at $T_E$.

Figure 6:
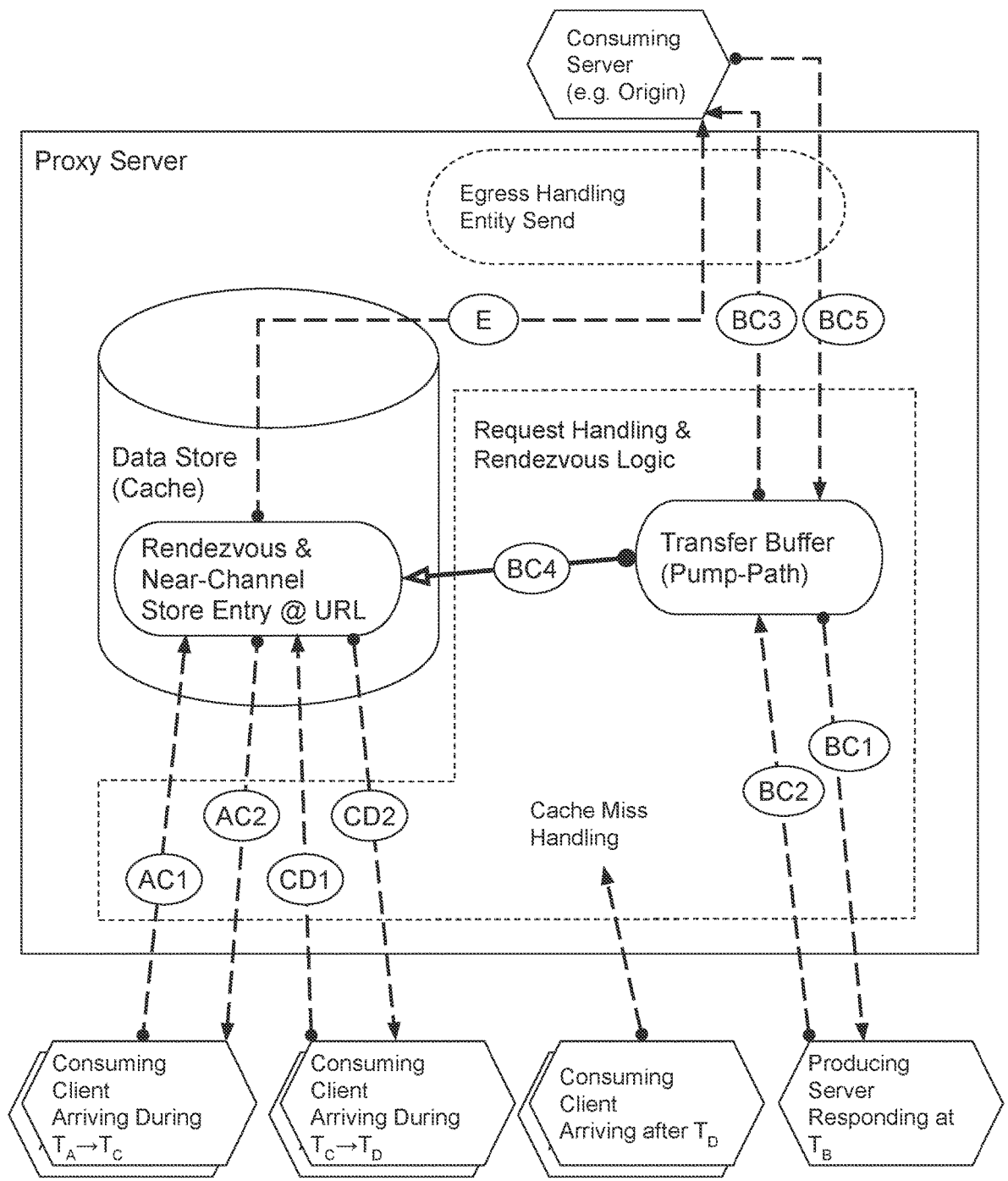
FIG. 6 is a block diagram illustrating an example of a message flow and operation at the proxy server from FIGS. 4A, 4B in greater detail; and, FIG. 7 is a block diagram illustrating hardware in a computer system that may be used to implement the teachings hereof.

FIG. 6 illustrates, in greater detail, the operation of the proxy server shown in FIGS. 4A, 4B and 5. The same circular labeling format is used as was already described with respect to FIG. 3.

The table below identifies each labeled message shown in FIG. 6:

| Label | Message (Example) | Description and Notes |
|---|---|---|
| AC1 | HTTP GET /path-foo/y;rendezvous | Client device requesting rendezvous service. (Note that in some implementations, conventional GET request to /y during rendezvous times could be implicitly treated as a rendezvous request if from certain clients, for certain entities; etc.) |
| AC2 | HTTP 200 ok containing entity /path-foo/y;rendezvous | Response to AC1 once entity is available in rendezvous store entry |
| BC1 | HTTP GET /path-foo/y | Request for entity /y (Note: in FIG. 4C embodiment, BC1 can be an HTTP/2 PUSH_PROMISE) from producing server to proxy server) |

-continued

| Label | Message (Example) | Description and Notes |
|---|---|---|
| BC2 | HTTP 200 ok with entity /path-foo/y | Response to BC1 with requested entity /y (Note: in FIG. 4C embodiment, BC2 can be an HTTP/2 response on server-initiated stream to push /y from producing server to proxy server) |
| BC3 | HTTP POST\|PUT /path-foo/y | Forward request to send entity upstream |
| BC4 | Internal call to a routine that writes entity from BC2 into a store entry | Internal operation to copy data from transfer buffer to store entry and notify request handling logic that is holding rendezvous requests |
| BC5 | HTTP 201 created | Conventional reply & acknowledgement of POST\|PUT at BC3 or E |
| CD1 | HTTP GET /path-foo/y;near | Client device requesting near-channel. (Note that in some implementations, conventional GET request to /y during near channel times could be implicitly treated as a near-channel request if from certain clients, for certain entities, etc.) |
| CD2 | HTTP 200 ok containing entity /path-foo/y;near | Response to CD1 from near-channel store entry |
| E | HTTP POST\|PUT for /path-foo/y (Asynchronous - alternative to BC3) | Asynchronous upload of entity from store entry |

FIG. 6 parallels FIG. 3 in many respects and the detailed description of proxy server operations provided in connection with FIG. 3 applies likewise. Note, however, in FIG. 6 the proxy server requests the entity (e.g., using an HITTP GET) at BC1, and the producing server responds at BC2. But as in FIG. 3, the proxy server can copy the entity bytes into the rendezvous and near-channel store entry (BC4), concurrent with synchronously pumping the bytes to the consuming server (BC3). Consuming clients can make requests at various times and upon request are served from the rendezvous and/or near-channel store entry (which once again are depicted here as a single entry in the data store). See AC1, AC2, CD1, and CD2, which represent the HTTP message exchanges during times $T_A$ to $T_C$ and $T_C$ to $T_D$, respectively.

Unlike FIG. 3, FIG. 6 illustrates an optional asynchronous operation in which the proxy server uploads the entity/y to the consuming server at some time $T_E$. In this situation, the transfer buffer may no longer exist and if so the entity can be sourced from the store entry in the data store. See flow E in FIG. 6. In summary, BC3 represents the synchronous upload, while E represents the asynchronous upload. BC5 is meant to generically represent the acknowledgement to either one.

Computation of URLs for Rendezvous and Near-Channel Services

In accord with the teachings in this document, there is a set of related URLs for the entity /y. There is the URL for the conventional GET request for the entity: http://domain<dot>com/path-foo/y There is the URL for use in making a rendezvous request, which is http://domain<dot>com/path-foo/y;rendezvous And there is the URL for the near-channel request, http://domain<dot>com/path-foo/y;near The URLS in the set above are predefined string transforms of one another, and this is preferable (but not necessary). It is preferable because given any one of the URLs, the proxy server, clients, or other devices, can can calculate the other URLs so as to be able to request those alternative services.

Alternative Embodiments for Identifying Service Request Types

In alternative implementations, the service being requested (rendezvous, near-channel, etc.) can be signaled in ways other than in the URL. For example, it could be signaled using a specific HTTP header field value (including a cookie or token with a specific value). In short, any attribute of the request can be used. The signaling could also be accomplished at other network layers, for example by configuring the proxy server to treat a particular client identifier (e.g. source or destination IP address) as a request for rendezvous, near-channel or other related service. For example, an HTTP request to a URL made to a first IP address of the proxy server may be treated as a request for conventional HTTP services, while an HTTP request to the same URL but to a second IP address of the proxy server may be treated as a rendezvous request. A consuming device could also use an out of band channel to request rendezvous service for requests, including for groups or certain classes of requests that it expects to send.

The service being requested can also be something that the proxy server determines contextually, e.g., based on the time when the request is made. For example, a client request received during the rendezvous period or near-channel can be treated as a request for rendezvous or near-channel services, respectively. This may be thought of as the proxy server using "best efforts" to service a request locally, for entities that are configured as eligible for the services.

Alternative Embodiment Using HTTP/2 Server Push from Proxy Server to Consuming Clients It was mentioned earlier that a producing server could utilize HTTP/2 server push to push an entity /y to the proxy server. It should be clear that likewise server push can be used (if desired) to push an entity from the proxy server to a consuming client during the time period $T_B$ to $T_C$. For example, a consuming client can open a HTTP/2 stream to the proxy server by sending a HTTP/2 GET request for /y;rendezvous, which the proxy server interprets as a request for entity /y with rendezvous service. (Note that the request could be for /example_topic;rendezvous and still be associated to the entity /y if configuration classified entity y within the example_topic.) The proxy server could respond on that open stream with /y;rendezvous, which might be HTTP headers indicating that the connection is ok, and perhaps some meta-information about the arrival or status of entity /y in the data store or in the proxy server network. When the entity /y is received, which starts at $T_B$, the proxy server can issue a PUSH_PROMISE frame for the entity /y on the existing HTTP/2 stream (assuming still open). Per RFC 7540, a PUSH_PROMISE frame includes request headers and is effectively a server-initiated GET request for the promised entity. Unless the consuming client refuses the push (e.g., with a CANCEL or REFUSED_STREAM code in a RST_STREAM frame), the proxy server can push the entity/y over a new, server-initiated stream, using an HTTP/2 response with data frame(s) per RFC 7540, and finishing with an END_STREAM frame.

FIGS. 3 and 6 would change as follows: message AC1 would represent the consuming client's HTTP/2 GET request for /y;rendezvfous. Message AC2 would represent the proxy server's server push of entity /y using the appropriate frames as described above. The HTTP/2 stream (and overall connection) would close at some later time, but that is not depicted.

Server push can also be used for near-channel requests.

Computer Based Implementation

The teachings hereof may be implemented using conventional computer systems, but modified by the teachings hereof, with the components and/or functional characteristics described above realized in special-purpose hardware, general-purpose hardware configured by software stored therein for special purposes, or a combination thereof, as modified by the teachings hereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 7:
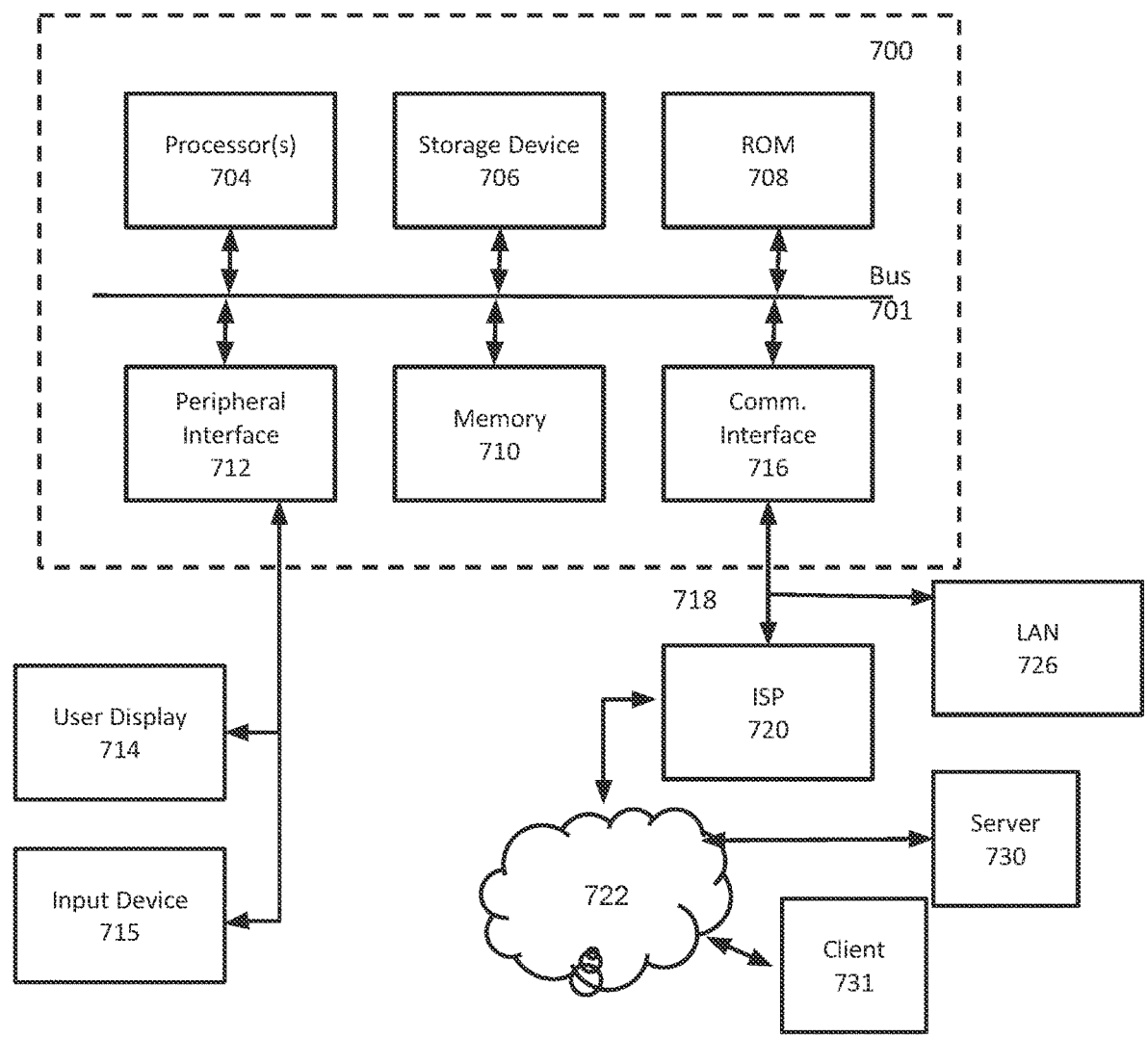

FIG. 7 is a block diagram that illustrates hardware in a computer system 700 upon which such software may run in order to implement embodiments of the invention. The computer system 700 may be embodied in a client device, server, personal computer, workstation, tablet computer, mobile or wireless device such as a smartphone, network device, router, hub, gateway, or other device. Representative machines on which the subject matter herein is provided may be a computer running a Linux or Linux-variant operating system and one or more applications to carry out the described functionality.

Computer system 700 includes a microprocessor 704 coupled to bus 701. In some systems, multiple processor and/or processor cores may be employed. Computer system 700 further includes a main memory 710, such as a random access memory (RAM) or other storage device, coupled to the bus 701 for storing information and instructions to be executed by processor 704. A read only memory (ROM) 708 is coupled to the bus 701 for storing information and instructions for processor 704. A non-volatile storage device 706, such as a magnetic disk, solid state memory (e.g., flash memory), or optical disk, is provided and coupled to bus 701 for storing information and instructions. Other application-specific integrated circuits (ASICs), field programmable gate arrays (FPGAs) or circuitry may be included in the computer system 700 to perform functions described herein.

A peripheral interface 712 may be provided to communicatively couple computer system 700 to a user display 714 that displays the output of software executing on the computer system, and an input device 715 (e.g., a keyboard, mouse, trackpad, touchscreen) that communicates user input and instructions to the computer system 700. However, in many embodiments, a computer system 700 may not have a user interface beyond a network port, e.g., in the case of a server in a rack. The peripheral interface 712 may include interface circuitry, control and/or level-shifting logic for local buses such as RS-485, Universal Serial Bus (USB), IEEE 1394, or other communication links.

Computer system 700 is coupled to a communication interface 716 that provides a link (e.g., at a physical layer, data link layer,) between the system bus 701 and an external communication link. The communication interface 716 provides a network link 718. The communication interface 716 may represent an Ethernet or other network interface card (NIC), a wireless interface, modem, an optical interface, or other kind of input/output interface.

Network link 718 provides data communication through one or more networks to other devices. Such devices include other computer systems that are part of a local area network (LAN) 726. Furthermore, the network link 718 provides a link, via an internet service provider (ISP) 720, to the Internet 722. In turn, the Internet 722 may provide a link to other computing systems such as a remote server 730 and/or a remote client 731. Network link 718 and such networks may transmit data using packet-switched, circuit-switched, or other data-transmission approaches.

In operation, the computer system 700 may implement the functionality described herein as a result of the processor executing code. Such code may be read from or stored on a non-transitory computer-readable medium, such as memory 710, ROM 708, or storage device 706. Other forms of non-transitory computer-readable media include disks, tapes, magnetic media, SSD, CD-ROMs, optical media, RAM, PROM, EPROM, and EEPROM, flash memory. Any other non-transitory computer-readable medium may be employed. Executing code may also be read from network link 718 (e.g., following storage in an interface buffer, local memory, or other circuitry).

It should be understood that the foregoing has presented certain embodiments of the invention but they should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that any trademarks appearing herein are the property of their respective owners and used for identification and descriptive purposes only, and not to imply endorsement or affiliation in any way.

The invention claimed is:

1. An entity transfer process performed at a proxy server, comprising:
   receiving an entity from a producing device, the producing device comprising at least one of:
      (i) a first client of the proxy server, and
      (ii) a first server responding to a prior request from the proxy server;
   responsive to the receiving of the entity, transmitting the entity to a second server;
   contemporaneous with the transmitting of the entity to the second server, making the entity available to clients from a store entry at the proxy server, upon request to a URL;
   either prior to or contemporaneous with the receiving of the entity from the producing device, receiving from a second client a request directed to the URL, and responsive thereto, serving the entity from the store entry; and, wherein the serving of the entity to the second client is contemporaneous with the transmitting of the entity to the second server.

2. The process of claim 1, wherein the second server comprises any of a cache parent and an origin server.

3. The process of claim 1, wherein the producing device comprises the first client.

4. The process of claim 1, wherein the producing device comprises the first server.

5. The process of claim 1, further comprising copying the entity from a transmission buffer into the store entry to make the entry available to clients upon request.

6. The process of claim 1, wherein the serving of the entity to the second client begins before completion of the transmitting of the entity to the second server.

7. The process of claim 1, further comprising, a proxy server routine calculating a store entry key for the store entry at least by changing one or more aspects of an input HTTP request to create an output HTTP request to use in the calculation.

8. The process of claim 1, wherein the producing device comprises the first client, which publishes on a topic, and the second client comprises a subscriber for the topic, the entity comprising a message related to the topic.

9. The process of claim 1, wherein the serving of the entity to the second client and the transmitting of the entity to the second server comprise at least two distinct connections.

10. The process of claim 1, wherein the proxy server comprises an HTTP proxy server, and, at least one of:

(a) the producing device comprises the first client, and the entity is received from the first client in an HTTP POST or PUT request; and
(b) the producing device comprises the first server, and the entity is received from the first server responsive to an HTTP message request from the proxy server.

11. The process of claim 1, wherein the proxy server comprises an HTTP proxy server that communicates with the producing device, the second client, and the second server using HTTP messages.

12. A non-transitory computer readable medium holding computer program instructions for execution on one or more processors, the computer program instructions including instructions to cause a proxy server to:

receive an entity from a producing device, the producing device comprising at least one of:
  (i) a first client of the proxy server, and
  (ii) a first server responding to a prior request from the proxy server;
responsive to the receiving of the entity, transmit the entity to a second server;
contemporaneous with the transmitting of the entity to the second server, make the entity available to clients from a store entry at the proxy server, upon request to a URL;
either prior to or contemporaneous with the receiving of the entity from the producing device, receive from a second client a request directed to the URL, and responsive thereto, serve the entity from the store entry; and,
wherein the serving of the entity to the second client is contemporaneous with the transmitting of the entity to the second server.

* * * * *